(12) United States Patent  
Ploeger

(10) Patent No.: US 6,244,938 B1  
(45) Date of Patent: Jun. 12, 2001

(54) DRILL GRINDER

(75) Inventor: Randall J. Ploeger, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 09/397,831

(22) Filed: Sep. 17, 1999

Related U.S. Application Data

(60) Provisional application No. 60/144,603, filed on Jul. 16, 1999.

(51) Int. Cl.[7] .................................................. B24B 3/26
(52) U.S. Cl. ............................................ 451/65; 451/375
(58) Field of Search ............................... 451/48, 65, 377, 451/376, 375, 374, 213

(56) References Cited

U.S. PATENT DOCUMENTS

| | | |
|---|---|---|
| 2,109,308 | 2/1938 | Adams . |
| 2,124,093 | 7/1938 | Wells . |
| 2,536,823 * | 1/1951 | Smith .................................. 451/375 |
| 2,556,073 * | 6/1951 | Dixon .................................. 451/375 |
| 4,001,975 | 1/1977 | Bernard et al. . |
| 4,093,247 | 6/1978 | Bernard et al. . |
| 4,471,581 | 9/1984 | Bernard et al. . |
| 4,485,596 | 12/1984 | Bernard et al. . |
| 5,649,853 * | 7/1997 | Kuo ..................................... 451/375 |

* cited by examiner

*Primary Examiner*—Robert A. Rose  
(74) *Attorney, Agent, or Firm*—Banner & Witcoff, Ltd.

(57) ABSTRACT

A drill grinder includes a grinding wheel mounted on a platform for fixed rotation about an axis. A first fixture is provided for properly orienting a drill bit in a chuck or collet. A second fixture is provided for guiding movement of a chuck or collet properly with respect to the grinding surface of the grinding wheel in order to sharpen the end of the drill bit in the chuck. A third fixture is provided for receipt of the chuck or collet with the drill bit properly oriented therein for positioning the bit against a second grinding wheel to effect a point splitting or web thinning operation.

6 Claims, 10 Drawing Sheets

FIG.14
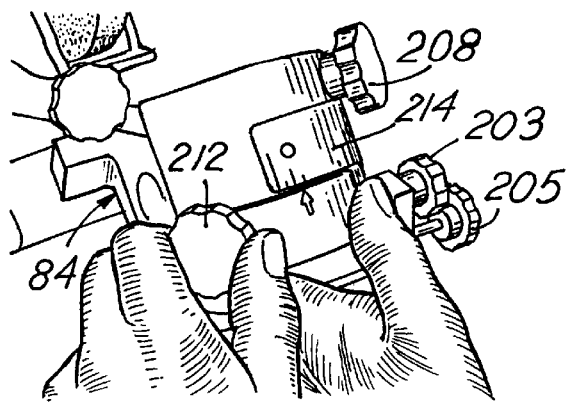
FIG.15
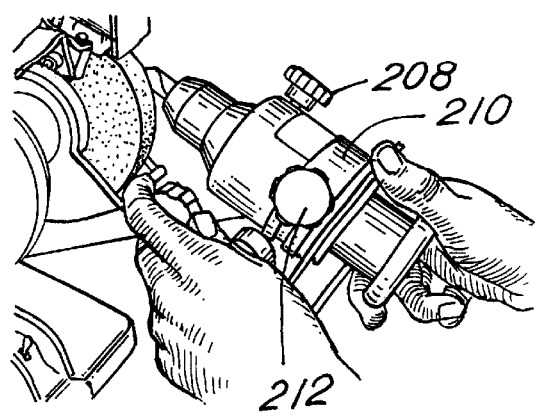
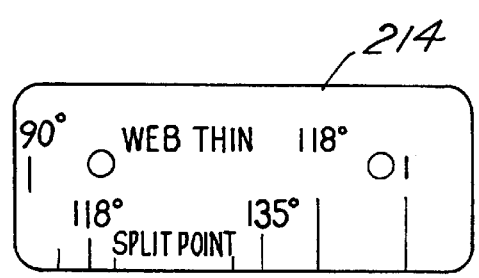
FIG.16
FIG.17
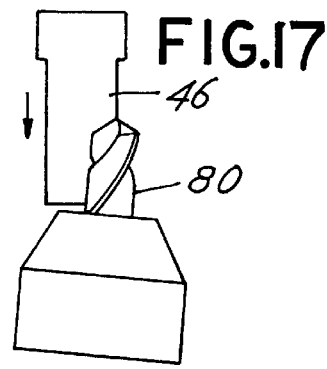
FIG.18
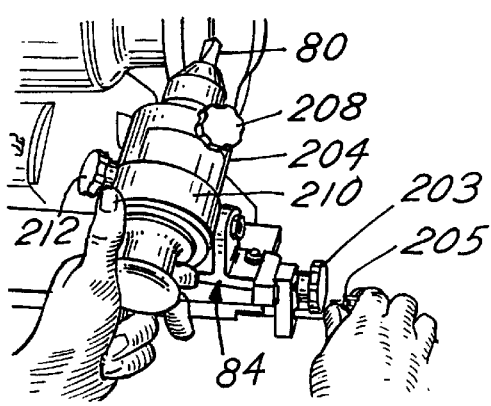
FIG.19  FIG.20
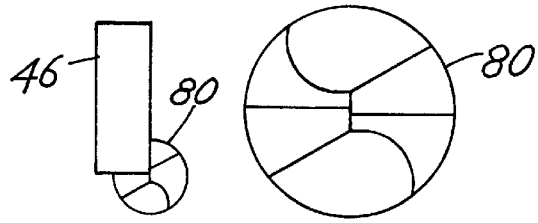

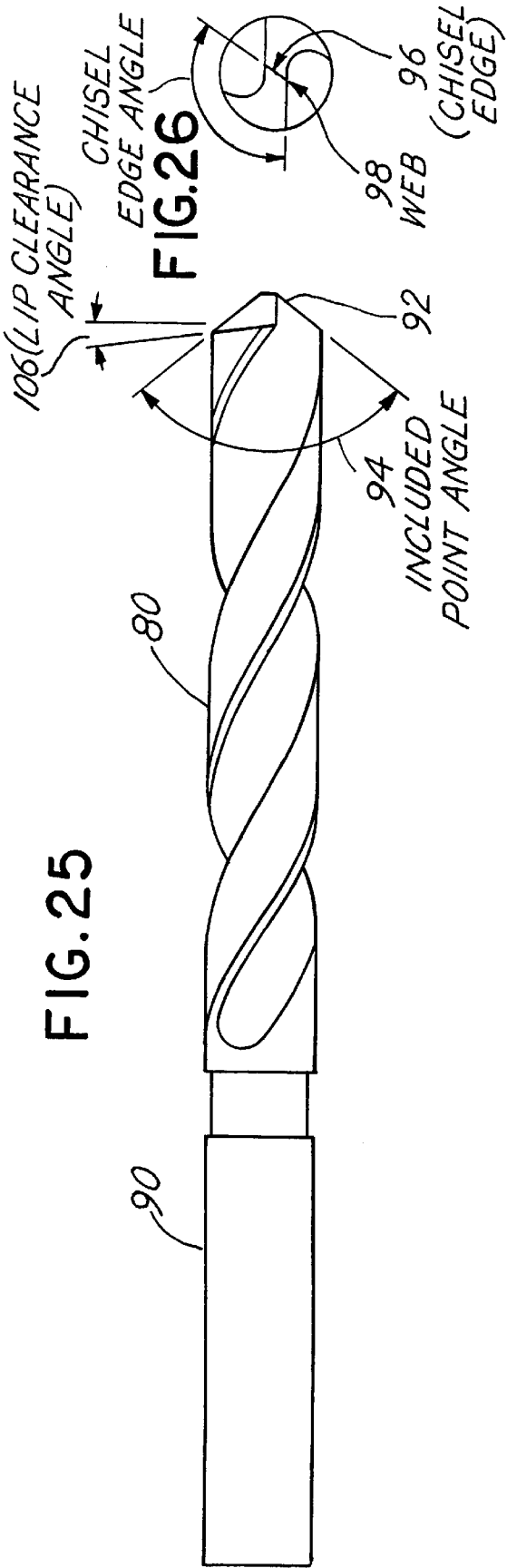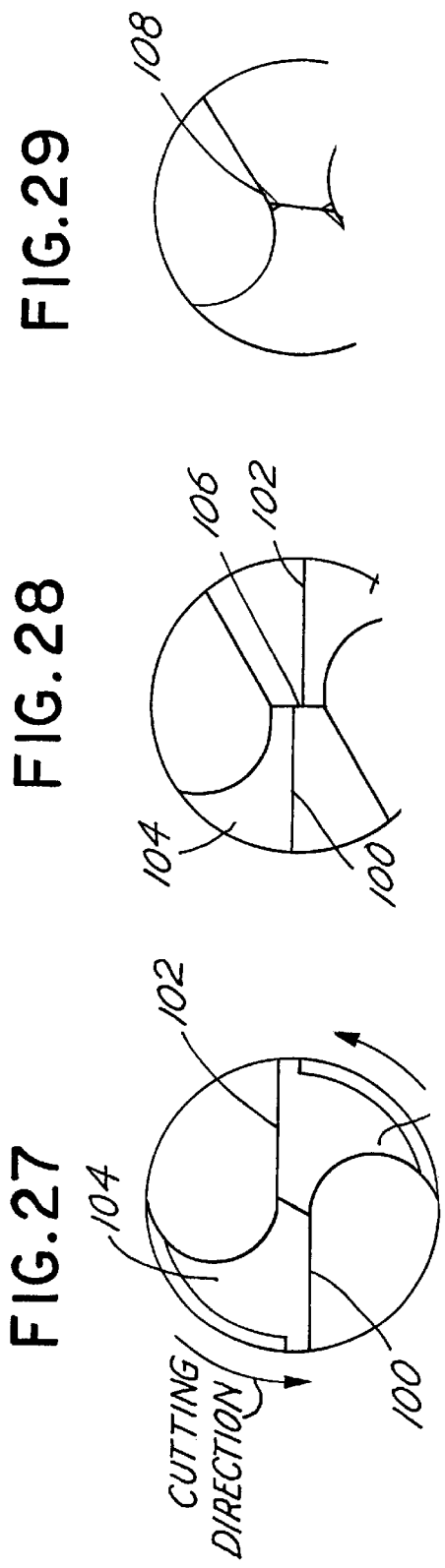

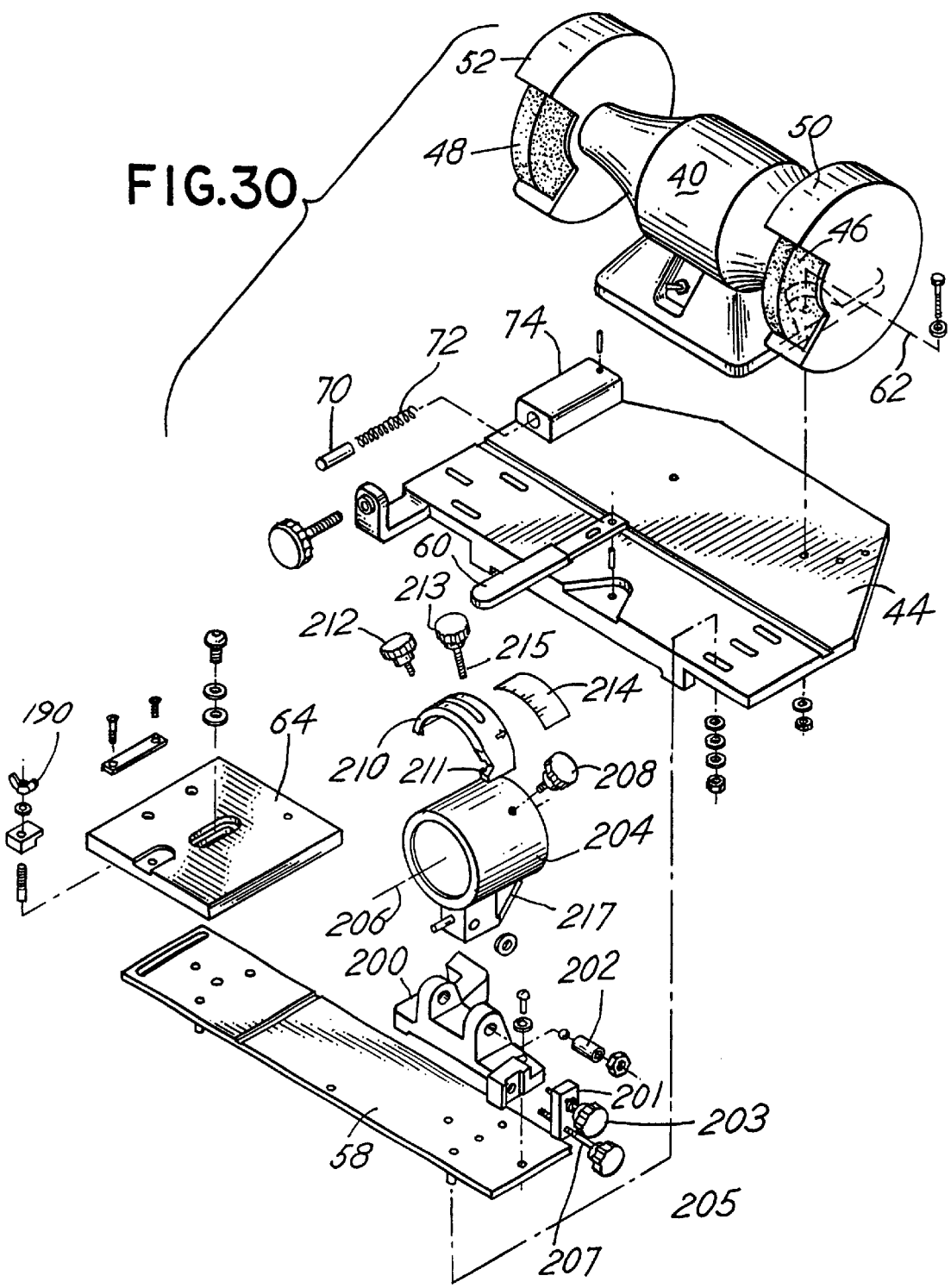

DRILL GRINDER

CROSS REFERENCE TO RELATED APPLICATION

This is a utility application based upon a provisional application Ser. No. 60/144,603 filed Jul. 16, 1999 for which priority is claimed.

BACKGROUND OF THE INVENTION

This invention relates to a drill grinder, and, more particularly, to a portable drill grinder useful for sharpening a drill point.

Portable drill grinders useful in machine shops and the like have been available for decades. One of the original basic disclosures relating to such grinders is found in U.S. Pat. No. 2,109,308 for a drill grinder issued Feb. 22, 1938, incorporated herewith by reference. A companion patent disclosing a portable drill grinder and setting forth information regarding the technology of grinding drill points on drill bits is U.S. Pat. No. 2,124,093 for a grinding machine issued Jul. 19, 1938. Subsequent patents relating to drill grinder constructions include U.S. Pat. No. 4,001,975 and U.S. Pat. No. 4,093,247. Other patents relating to this general technology include U.S. Pat. No. 4,485,596 and U.S. Pat. No. 4,471,581.

Typically, drill grinders of this type include a grinding wheel, which is mounted on a platform. A collet or chuck is provided to receive and hold a drill bit. A bracket is provided to support the collet in opposition to the grinding wheel. The collet is manipulated in the bracket to engage the point of the drill bit against the grinding wheel and thereby grind or sharpen the drill bit in accord with the manner in which the collet is manipulated within the bracket. Collet manipulation is controlled by compatible cams and followers on the collet and bracket. Nonetheless, adjustment of the collet and manipulation of the drill bit within the collet to effect proper forming of the point of the drill have long been challenging problems.

The present invention relates to a drill grinder which addresses the manner in which the bracket that supports the collet or chuck may be moved with respect to the grinding wheel to effectively grind the drill point. The invention also is directed to the collet construction as well as mechanisms for properly aligning a drill bit within a collet in order to enhance the point forming operation, including split point forming and thin web formation on a drill point.

SUMMARY OF THE INVENTION

Briefly, the present invention comprises a drill grinder which includes a mounting platform with a grinding wheel fixed on the mounting platform. A subplatform or assembly plate is slidably mounted on the mounting platform for translational movement in a direction parallel to the rotation axis of the grinding wheel. A bracket or fixture on the subplatform is mounted in a manner which permits feeding or movement of a collet or chuck which holds the drill bit in a direction perpendicular to the rotational axis of the grinding wheel. Feed mechanisms for the plate and bracket are provided. The collet or chuck is adapted to receive a drill bit of any one of multiple sizes and includes a removable conical front portion or section which enables conversion of the collet for acceptance of large size drill bits and smaller size drill bits.

A special drill bit orientation fixture or bracket is provided to facilitate orientation of the drill bit in the collet or chuck so that the point of the drill bit will be properly oriented in the collet or chuck with respect to the grinding surface of the grinding wheel in order to grind and sharpen the drill bit point in an effective manner when the collet is properly placed in the bracket mounted on the subplatform.

A further fixture or bracket is provided for supporting the collet or chuck in proper juxtaposition to a grinding wheel to form a split point or a thin web on the drill bit point.

Thus, it is an object of the invention to provide an improved drill grinder which includes a mounting platform assembly that enables positioning of the point of a drill bit against the surface of a grinding wheel in a manner that is highly adjustable.

It is a further object of the invention to provide an improved drill grinder assembly or construction which includes a unique collet for holding a drill bit and which permits adjustment of the collet for multiple sizes of drill bits.

Another object of the invention is to provide a drill grinder which includes a fixture that will ensure proper orientation of the drill bit in a collet or chuck for grinding of the point of the drill bit.

Another object of the invention is to provide a drill grinder which is economical, rugged, easy to transport and highly reliable.

These and other objects, advantages and features of the invention will be set forth in the detailed description which follows.

BRIEF DESCRIPTION OF THE DRAWING

In the detailed description which follows, reference will be made to the drawing comprised of the following figures;

FIG. 14 is an isometric view of the split point fixture or bracket;

FIG. 15 is an isometric view of the split point fixture or bracket in combination with the chuck or collet as it is positioned for engagement with a grinding wheel FIG. 16 is a plan view of the gauge, index or scale associated with a split point bracket fixture;

FIG. 17 is a schematic view of the manner in which a point is split using the fixture and grinding wheel as depicted in FIG. 15;

FIG. 18 is an isometric view of the bracket or fixture of FIG. 14 positioned for point splitting of a drill;

FIG. 19 is a schematic view of the point splitting operation;

FIG. 20 is an end view of a drill bit which has a split point formed in the manner depicted in FIG. 19;

FIG. 25 is a schematic view of a drill bit depicting the various elements and angles associated with a drill bit point;

FIG. 26 is an end view of the drill bit of FIG. 25 further illustrating the various elements thereof;

FIG. 27 is an enlarged end view of a drill bit illustrating the component elements thereof;

FIG. 28 is an end view of a drill bit wherein the bit has been formed with a split point;

FIG. 29 is an end view of a drill bit wherein the bit has been formed with a thinned web;

FIG. 30 is an exploded isometric view of the drill grinder and platform construction;

DESCRIPTION OF THE PREFERRED EMBODIMENT

Introduction

Figure 1:
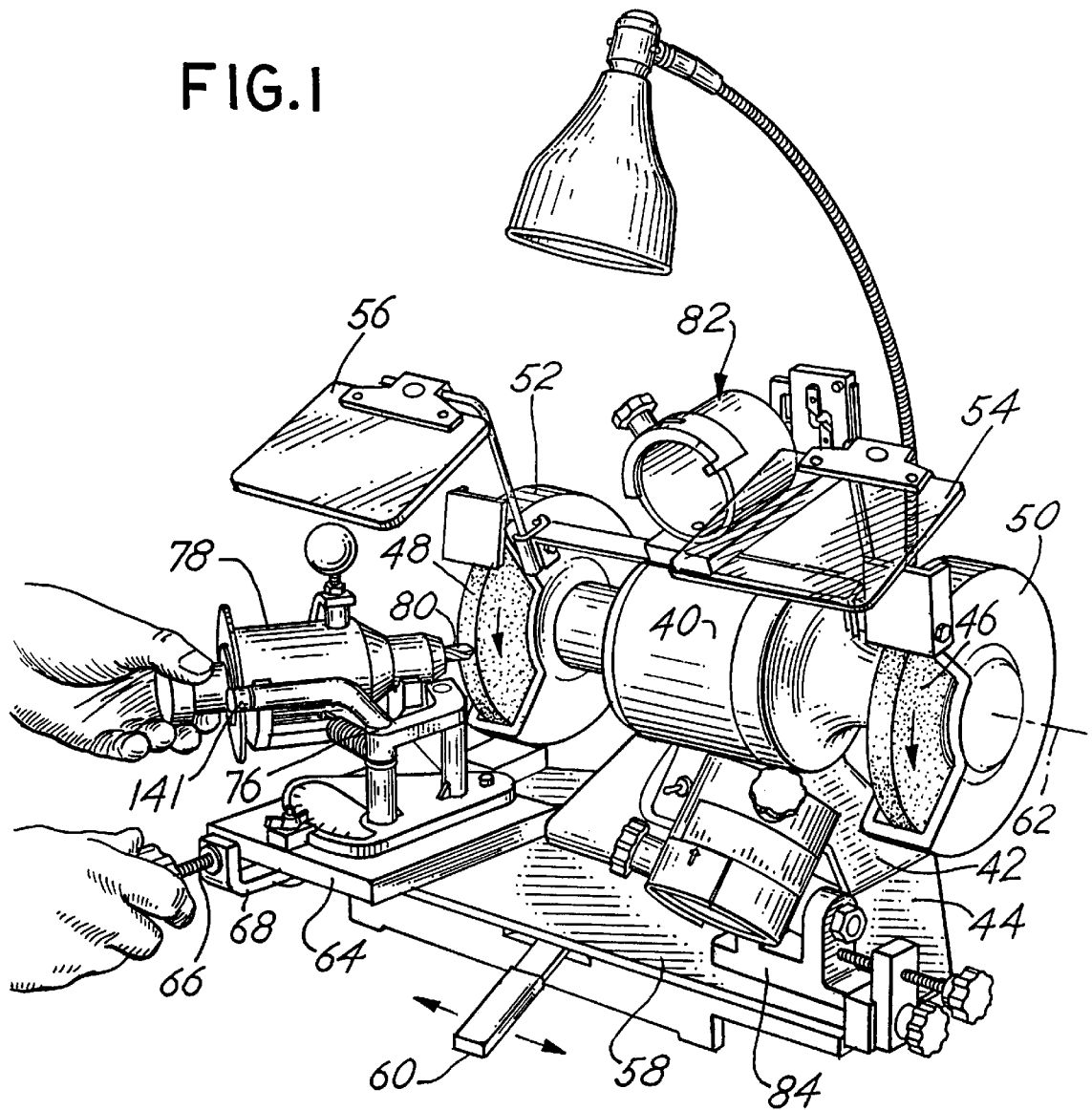
FIG. 1 is an isometric view of the drill grinder including the various brackets or fixtures and other subassemblies associated with the drill grinder.
Figure 32:
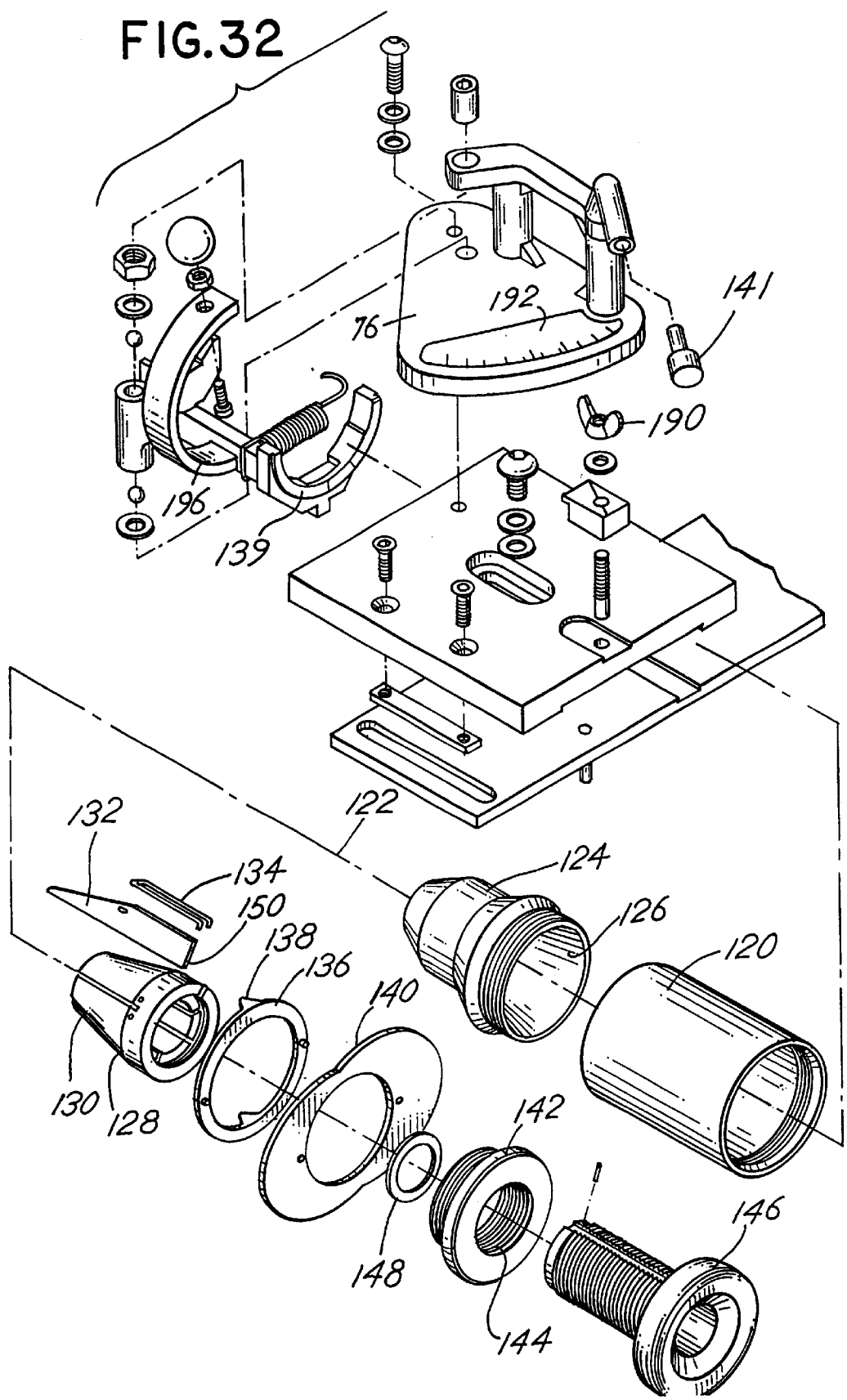
FIG. 32 is an enlarged exploded isometric view of the bracket used for forming and sharpening the drill bit in combination with the chuck or collet for holding the drill bit in the bracket.

Referring to the figures, the drill grinder of the invention is depicted as a composite set of multiple elements, including brackets, fixtures, grinding wheels, a motor and platforms in FIG. 1. FIG. 30 depicts the overall platform construction, which supports the drill grinder elements. FIGS. 25–29 are provided as a basis for explaining some of the geometry associated with the sharpening of a drill bit point. FIG. 32 is illustrative of the chuck or collet which supports the drill bit during the various grinding operations and provides for appropriate gripping and orientation of the drill during the maneuvering of the drill point with respect to a rotating grinding wheel. FIGS. 2, 3, 6–10 and 31 depict the bracket or fixture for establishing a lip clearance angle when positioning a drill bit in the chuck or collet of FIG. 32. FIGS. 4, 5, 11, 12, and 32 illustrate, in greater detail, the particular bracket or fixture which is used to support the chuck, and thus the drill bit, with respect to a rotating grinding wheel during the formation of a drill bit point. In other words, the noted figures are especially directed toward the sharpening of the drill point. FIGS. 14–24 illustrate a special bracket which is utilized to effect a split point on the end of the drill bit or to thin the web on the end of a drill bit.

It is noted that in the art, the various definitions associated with a drill bit and the end point thereof are standard definitions. The concept of a split point, a thin web, lip clearance angle of the point, and so on are all known in the art, but are reviewed in some minor detail for the purpose of describing the preferred embodiment of the invention.

Overview of Drill Grinder

Referring to the figures, and, in particular, FIGS. 1 and 30, the drill grinder includes a motor 40 mounted on a support bracket 42 which, in turn, is fixed to a fixed platform 44. The motor 40 includes an output shaft (not shown) on which are mounted at opposite ends thereof, grinding wheels 46 and 48. The grinding wheels 46 and 48 rotate in response to operation of the motor 40 as depicted in the Figures in the direction of the arrow. Each grinding wheel 46 and 48 is protected by a shroud 50 and 52 respectively. In practice, other safety features, such as eye shields 54, 56 are provided for each of the grinding wheels 46 and 48.

Supported on the base plate or platform 44 is a translatable subplatform or platform 58. The platform 58 is mounted for movement in response to actuation by a handle 60 in a direction parallel to rotation axis 62 of the grinding wheels 46 and 48. Thus, the platform 58, as depicted in FIG. 1, will move to the right or left depending upon the actuation thereof by the handle 60. This can be termed "X" axis movement.

Mounted on the platform 58 is a subassembly or subplatform or plate 64. The plate 64 is mounted for slidable motion in the "Y" direction or in a direction orthogonal or perpendicular to the rotation axis 62. Such movement is guided by slots in the bottom of the plate 64 and is effected by means of a turn knob 66 mounted on a bracket 68 which causes the platform or plate 64 to move toward a spring actuated piston 70 in FIG. 30. A spring 72 in a block 74 mounted on the base plate 44 biases piston 70. In this manner, the subassembly platform 64 may be moved back and forth in a direction (Y axis) orthogonal to the axis 62 (X axis).

The platform 64 includes thereon or provides a mounting bracket or mounting fixture 76 for a collet or chuck 78 which comprises a collet assembly for holding a drill bit 80 in appropriate relationship to the grinding wheel 48. Thus, by manipulation of the position of the chuck 78 on the bracket 76, the bit 80, and more particularly, the point of the bit 80 is ground or sharpened by the wheel 48. The particular mechanism and relationship of the movement of the chuck 78 with respect to the grinding wheel 48 is generally known and depicted in the various prior art patents referenced herein and incorporated by reference. The subject matter of the invention includes and relates to the construction of the chuck or collet, the manner in which the various combination of parts are assembled, and the fixtures to be described hereinafter and referenced hereinafter.

The drill grinder further includes another subassembly generally described as a fixture, bracket or subassembly 82 for determining and setting the lip clearance. This subassembly or bracket assembly 82 is described in more detail below. A further bracket or subassembly 84 is provided for effecting a split point on the end or point of a drill bit 80 or a thinned web on the end of a drill bit 80 by means of coaction with the grinding wheel 46. Again, the bracket 84 for forming split point and/or thin web will be described in greater detail below.

Briefly, operation of the drill grinder provides that a drill bit 80 be properly inserted in a chuck 78. The drill bit 80 is properly oriented by virtue of utilization of the lip clearance bracket 82. Thereafter, the chuck 78 is inserted into the grinding or sharpening bracket or fixture 76 used for the sharpening operation. The chuck 78 is then appropriately manipulated and guided by component parts of fixture 76 (i.e., cams and/or followers) so that the point of the drill bit 80 properly engages the grinding wheel 48 and is thus sharpened. Thereafter, the drill bit 80, as still incorporated in the chuck 78, may be positioned in the split point fixture or bracket 84. A split point may then be effectuated or provided on the point of the drill bit 80. Alternatively, the web on the end of the drill bit 80 may be thinned by coaction of the drill bit 80 mounted in the chuck 78, in turn, mounted in the bracket 84 and engaged with the grinding wheel 46.

Drill Bit Features

The following terms are not expressly discussed in a manner which attempts to alter the general meaning of terms in the art. Rather, it is to attempt to place the description of the preferred embodiment in the context of the art using the terms generally known in the art. With respect to this discussion, reference is made, in particular, to FIGS. 25–29.

The drill bit 80 includes a shank 90 and a point 92. The point 92 has an included point angle 94, a chisel edge 96, a web 98 which is an element between cutting edges or cutting lips 100 and 102. Trailing surfaces 104 and 106 behind the cutting edges 100 and 102, respectively, fall away at a lip clearance angle 103. Thus, as the drill bit 80 cuts material by rotation in the direction, for example, as indicated in FIG. 27, the lip clearance angle 106 permits cut material to fall away from the cutting edges 100 and 102. FIG. 28 depicts a split point wherein the cutting lips or edges 100, 102 are formed by cutting away a portion of the trailing surfaces 104 immediately adjacent the edges 100, 102. The leading cutting edges 100, 102, have been juxtaposed by virtue of material being cut away so that the end point is in the form of a split point 106.

FIG. 29 illustrates a configuration wherein the web 98 has been thinned at the point of bit 80 by cutting into the web at surfaces 108 and 110. Thus, FIG. 29 depicts the end view of the drill bit 80 having a thinned web 98.

The Chuck or Collet Construction

FIG. 32 discloses, inter alia, the chuck or collet 78 which is provided to hold a drill bit 80 tightly projecting from the end thereof. The chuck 78 includes a main body 120 which is a hollow cylindrical member having a center line axis 122. A removable, hollow nose section 124 has a frustoconical interior surface 126 and is axially aligned and threadably attached to the body section 120. A conical jaw holder 128 includes a series of longitudinal slots 130 equally spaced about the outer periphery thereof for receipt of blades 132 that cooperate with biasing springs 134 that have a hairpin shape and fit through the blades 132 with the ends of the spring 134 fitted in openings in the outer peripheral surface of the hollow jaw holder 128. The springs 134 thus bias the blades 132 outwardly in an radial direction from the axis 122. When the jaw holder 128 including the blades 132 and springs 134 are engaged by the inner frustoconical surface 126 of the long nose section 124, then the blades 132 are forced radially inwardly. When forced radially inwardly, they grip tightly a drill bit 80, for example, positioned axially within the chuck 78.

The chuck 78 further includes a cam member 136 with axial projections 138 for guiding axial movement of the chuck in bracket 76 as will be described hereinafter. A radial cam member 140 is also provided for guiding axial inclination of bit 80 relative to wheel 48 when chuck 78 is mounted on bracket 76. The component parts are held together by a threaded flange 142 which threads into the body section 120. The threaded flange 142 includes a threaded interior passage 144 for receipt of a threaded knob 146 which may be threaded through the flange 144 to impinge against a washer 148 that, in turn, impinges against the flat, back side of blades 132 as well as the jaw holder 128 thereby causing the blades 132 to be guided radially inwardly to hold a drill bit 80. Note that the washer 148 is planar and has a surface orthogonal or perpendicular to the axis 122 and thus mates or engages against the flat surfaces 150 on the end of the blades 132. Tightening the knob 146 effectively tightens the blades 132 against the drill bit 80 over a wide range of sizes or bit diameters.

The nose section 124 may be replaced with a nose section having a different configuration or size frustoconical surface 126 to accommodate different sizes of drill bits. Thus, the chuck 78 of the preferred embodiment includes a construction which enables replacement of the nose section 124 to accommodate drill bits of over a wide range of sizes.

In FIG. 32 the chuck or collet 78 is shown in combination with components parts of the bracket 76 which is used for facilitating sharpening. The chuck 78, however, is a separate independent component part of the drill grinder and may be moved from bracket to bracket, depending upon the operation being performed. Thus, the following description relates to the fixture or bracket 82 for setting the lip clearance. This bracket 82 is depicted in FIGS. 2, 3, 6–10, and 31 in the sequence of operation of the drill grinder is the bracket 82 that is initially used in combination with the chuck 78 followed by use of the sharpening bracket 76 depicted in FIG. 32, for example.

Lip Clearance Bracket Construction

Referring to FIGS. 2, 3, 6–10, and 31, the lip clearance bracket 82 comprises a cylindrical body member or tube 160 having a center line axis 162 sized to receive the chuck or collet 78. The tube 160 is mounted on a fixed plate 164 in a manner where the axis 162 is orthogonal to a series of plates 166, 168 and 170 mounted at one end of the plate 164 in opposition to the tube 160. The plates 166, 168, 170 support opposed drill bit lip aligning members 172. The lip aligning members 172 are slidably mounted on the outside of plate 170 and each include a pin or bolt 174 projecting through the plates 168, 170 and attached to the lip aligner member 172. The pin 174 fits through an inclined passage opening 176 in the plate 168. The plate 168 is slidable transversely to the axis 162. The plate 168 includes a bit size opening or passage 178 along one side thereof. The lip aligners 172 are arranged on opposite sides of the axis 162 at 180° intervals and are movable radially toward and away from each other in response to sliding motion of the plate 168. In this manner, the lip alignment members 172 may be moved to a precise radial distance from the axis 162.

A slidable collet stop 180 is mounted on the outside of the tube 160 and is adjustable by means of adjustment knob 182. Adjustment knob 182 adjusts the relative position of the slidable collet stop 180 in accord with settings on a gauge or decal 84. The settings are correlated to the lip clearance angle desired on a bit 80.

Figure 2:
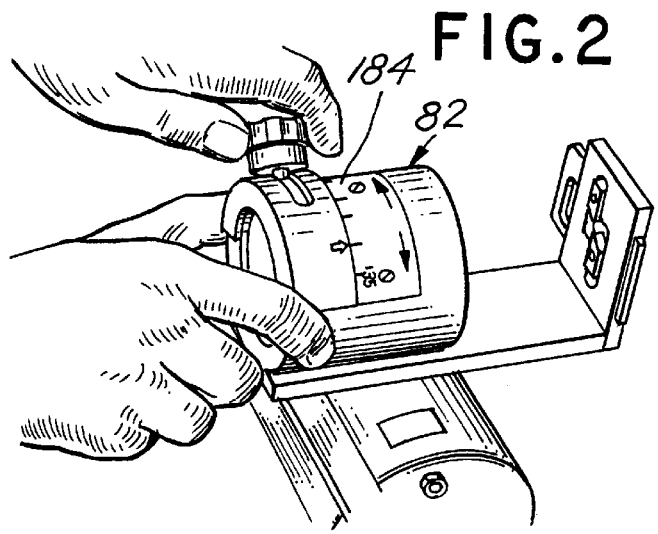
FIG. 2 is an isometric view of the fixture associated with setting lip clearance for the drill grinder.
Figure 3:
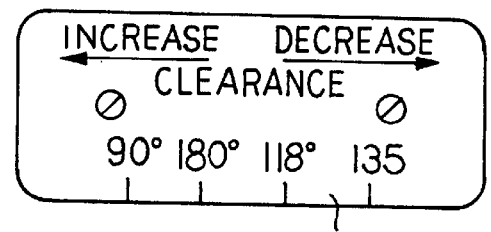
FIG. 3 is a view of the legend or scale associated with the bracket or fixture of FIG. 2.
Figure 4:
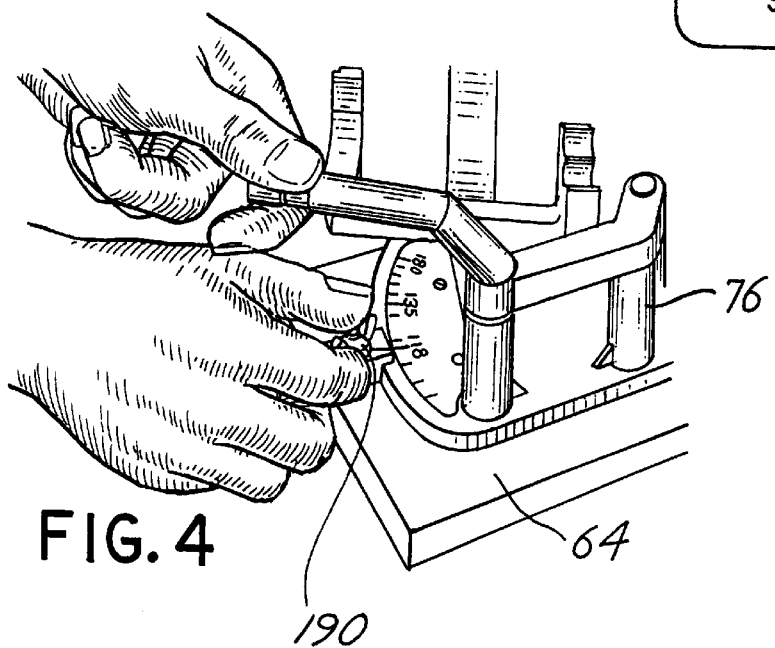
FIG. 4 is an isometric view of the bracket or assembly associated with the setting of the drill point angle and for holding the chuck or collet with the drill bit therein for engagement with a grinding wheel to sharpen the point thereof.
Figure 5:
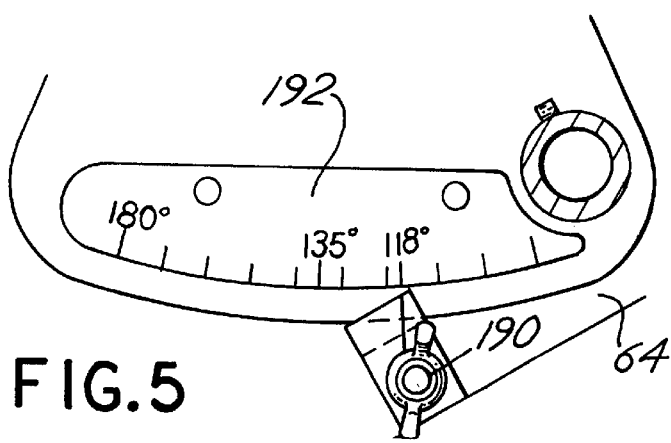
FIG. 5 is a plan view of the gauge or scale of FIG. 4.

In practice then, the collet or chuck 78 is properly aligned with the fixture 82 and more particularly, the tube 160 and the collet or chuck aligner 180. That is, the collet or chuck aligner 180 is set to define an appropriate lip clearance angle, for example, as depicted in FIGS. 2 and 3. Thus, the cam 138 of the chuck 78 is aligned with a cam stop lug 181 after the cam stop 180 has been properly adjusted per scale 184. Thereafter, as described below, the drill bit 80 is appropriately aligned in the chuck 78. Adjustment of the collet stop 180 thus permits setting or adjustment of the lip clearance angle.

Figure 6:
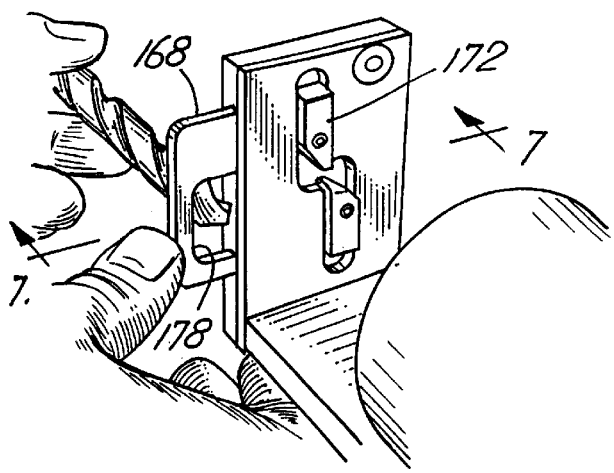
FIG. 6 is an isometric view of the lip clearance mechanism depicted in FIG. 2.
Figure 7:
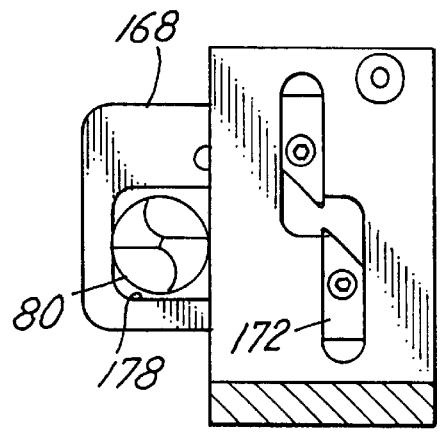
FIG. 7 is an elevation taken along the line 7—7 in FIG. 6.
Figure 8:
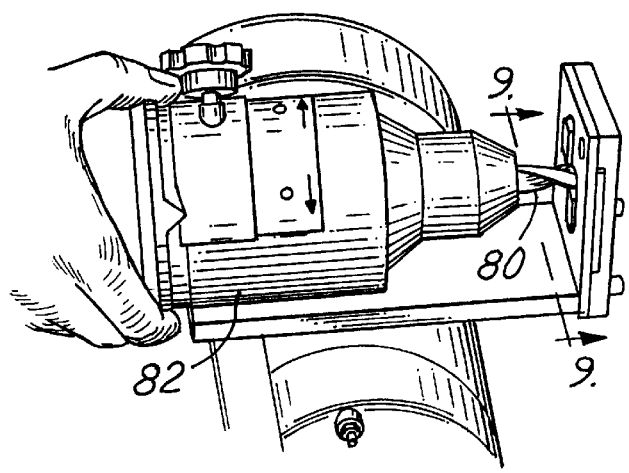
FIG. 8 is an isometric view of the fixture of FIG. 2 during use.
Figure 9:
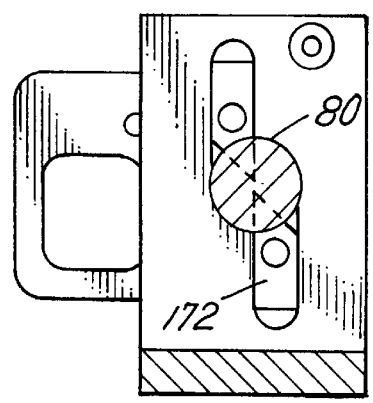
FIG. 9 is a sectional view taken along the line 9—9 in FIG. 8.
Figure 10:
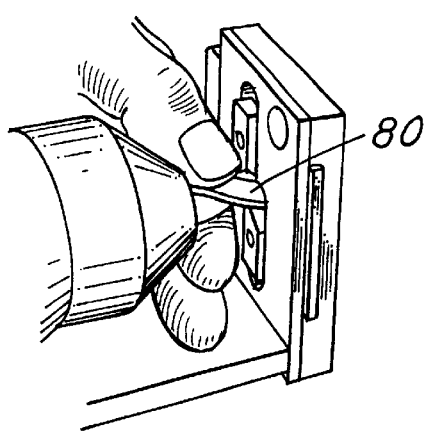
FIG. 10 is an isometric view of the further use of the fixture of FIG. 2.
Figure 11:
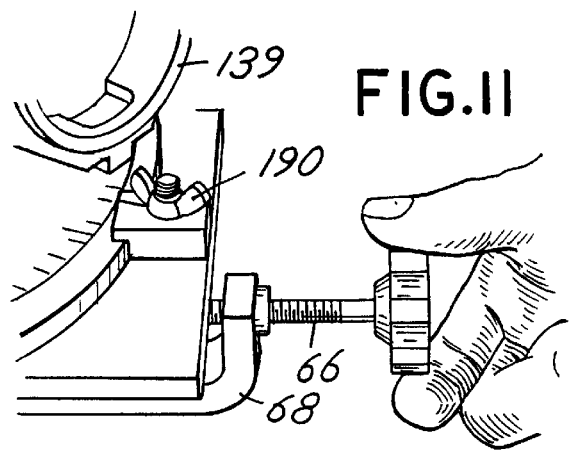
FIG. 11 is an isometric view of the manner in which the subassembly or platform of FIG. 4 is adjusted.
Figure 12:
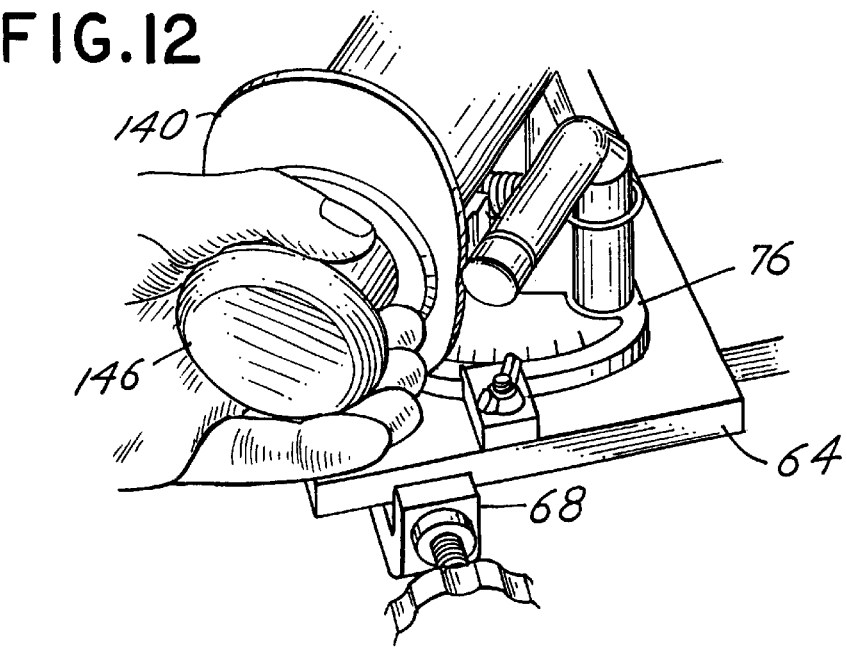
FIG. 12 is another isometric view showing the manner in which the collet holding a drill bit is supported by the associated bracket as depicted in FIG. 4.
Figure 13:
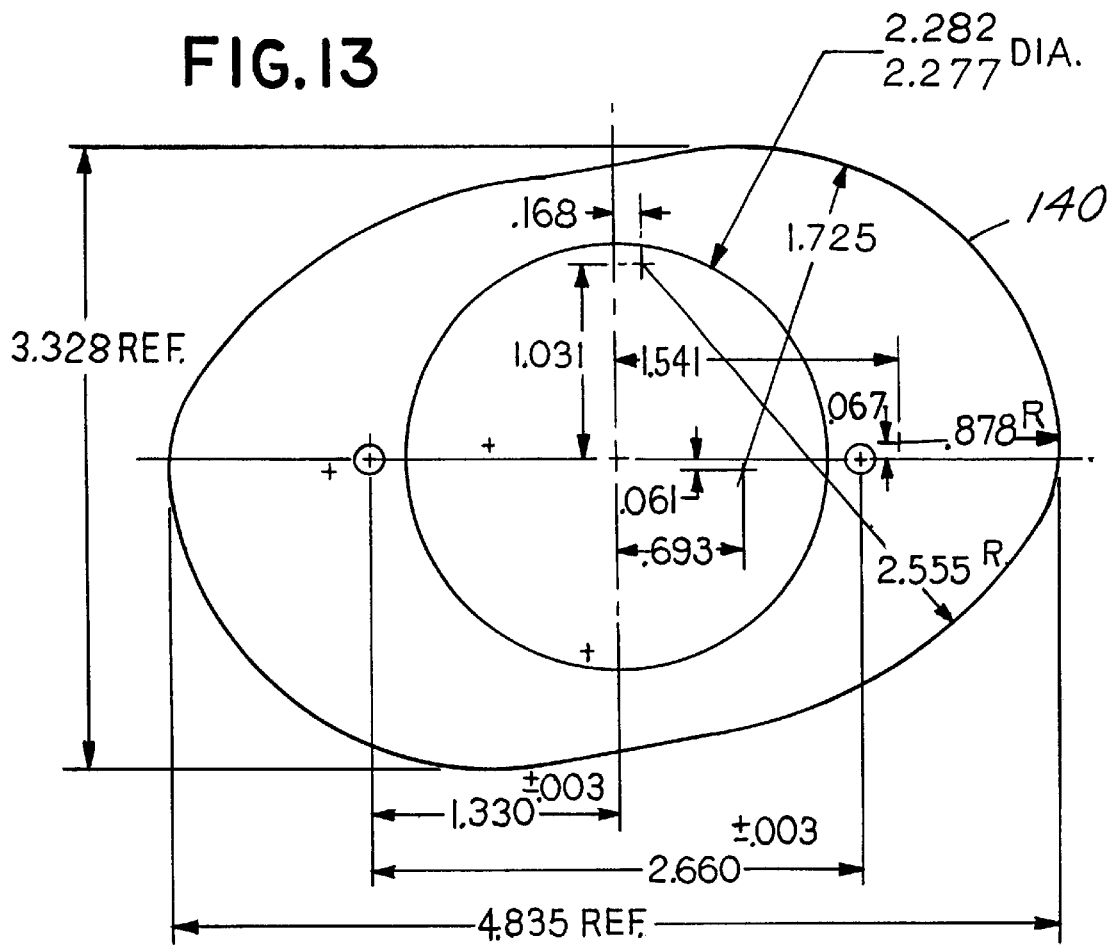
FIG. 13 is a plan view of the cam which is utilized in association with the chuck or collet and cooperates with the bracket of FIG. 4.
Figure 21:
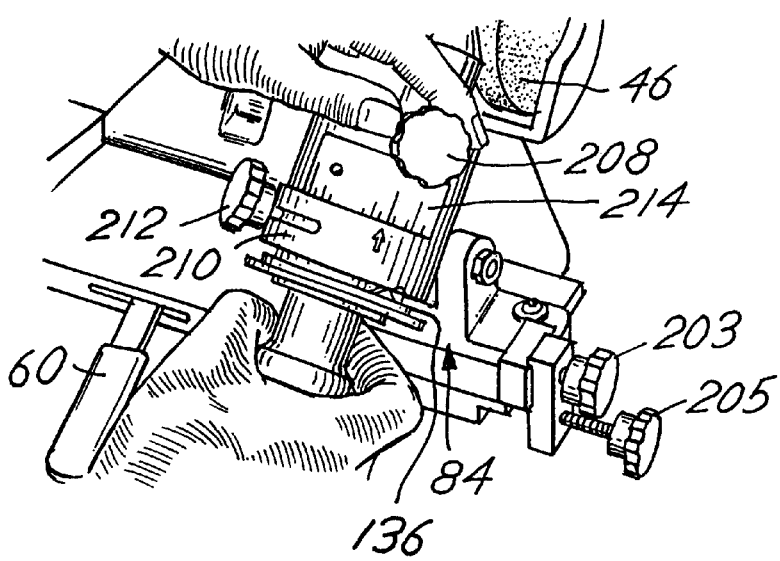
FIG. 21 is an isometric view of the fixture of FIG. 14 positioned to perform a web thinning operation on a drill bit.

Next, the drill bit 80 is inserted through the opening 178 in plate 168, and the plate 168 is caused to slide in a manner which fixes the plate 168 so that the drill bit 80 will just fit within the opening 178. This is depicted in FIGS. 6 and 7. By this action, the lip aligners 172 are precisely positioned in a coordinated fashion with respect to the size of the drill bit 80 that has been placed in the opening 178. After this setting is accomplished, bit 80 is inserted in the chuck 78 and the chuck 78 is placed in the tube 160. The drill bit 80 is thus positioned along the axis 162 into the opening through the plate 170 against the plate 168 and rotated manually until the cutting edges 100, 102 of the drill bit 80 are engaged by the lip aligner members 172. Thereafter, the knob 146 of the chuck or collet is tightened to hold the drill bit 80 in fixed position in the collet or chuck 78. The chuck 78 with bit 80 therein are now assembled for placement in a bracket or fixture for sharpening of the point of bit 80.

Sharpening Bracket Construction

FIGS. 4, 5, 11, 12, and 32 depict in greater detail the construction of the bracket 76 adapted to receive the chuck in which the bit 80 has been appropriately positioned by use of the lip clearance fixture 82. Specifically, the bracket 76 is appropriately mounted on the platform 64 and adjusted by means of adjustment screw 190 to define the desired included point angle. This is done by reviewing or setting the gauge 192 as depicted, for example, in FIGS. 4 and 5. The chuck 78 is then inserted into the bracket 76 and retained by a holder 196. In operation, as described in various prior art references, the chuck 78 is manually rotated in the bracket 76 causing the point of the drill bit 80 to swing back and forth over the surface of the grinding wheel 48 in accord with the swinging pattern effected by cam 140 on follower 141 of bracket 76 and axial movement toward and away from that surface effected by the cam 136 and projection 138 coacting with surface 139 on bracket 76. The entire platform 64 may also be advanced by operation of the knob and threaded screw 66 toward the grinding wheel 48 and may be moved over the surface of the grinding wheel 48 by movement of the handle 60 to move platform 58. Thus, the present embodiment provides for additional latitude with respect to movement of the entire platform 64.

Bracket Construction For Split Point and Thin Web Operation

FIGS. 14–24 illustrate yet a further bracket 84 and its construction and operation for the use of providing a web thinning or split point operation. FIG. 30 further depicts the fixture or bracket 84 which is utilized for web thinning or split pointing in combination with the wheel 46. That is, mounted on the platform 58 is a base 200. Pivotally mounted for movement about a connecting pin 202 is a tube 204. The tube 204 has an axis 206 which is generally orthogonal, but slightly canted at an angle to an orthogonal direction to the axis 62.

The tube 204 includes a tightening knob 208 for retention of the chuck or collet 78 therein. The tube 204 further includes an adjustable collet stop 210 which may be adjusted by means of a threaded knob 212 to a desired angle or orientation in accord with a gauge 214. The chuck or collet 78 is placed in the tube 204 and the cam stop 138 engages against a lip or stop 211 that is provided to give an appropriate adjustment. The chuck 78 and tube 204 with the drill bit 80 projecting from the end thereof are then pivoted about the pin 202 to engage the right edge of wheel 46. One half of the web is thinned or the point split by engagement of the one stop 138 of a chuck cam 136. There are two stops 138 spaced 180° apart. Thus, rotating the chuck 180° effects or permits the thinning and/or point splitting on the opposite lobe of the drill bit 80 point.

The fixture 84 also includes a mechanism for adjusting the movement of the fixture 84 with the moveable platform 58. Thus, referring to FIGS. 1 and 30, the base 200 includes a block 201 attached thereto by a threaded pin or knob 203. An adjustment knob 205 is threaded through the block 201. The adjustment knob includes a threaded rod 207 which engages the roller base platform 44. By turning the knob 205 it is possible to adjust the position of the fixture 84 to the right in FIGS. 1 and 30. Pushing on the handle 60 moves the platform 58 and thus the fixture 84 to the left in FIGS. 1 and 30. The knob 205 thus provides a fine adjustment of the fixture 84 in a direction along the axis 62 of the wheel 46.

An adjustment knob 213 is provided to control the setting of an adjustment pin 215 fitted in li the leg 217 of the tube 204. The adjustment of the knob 213 thus adjusts the pivot angle of the tube 204 about the pin 202. In this manner, a collet or chuck 78 mounted in the tube 204 can be adjusted about the axis of the pin 202 to control the engagement of a bit 80, and more particularly, the point of a bit 80, with the rotating wheel 46. In practice in order to form a split point or a thin web, the point of bit 80 is engaged with the right hand side of the grinding wheel 46.

In operation, after sharpening the point or bit 80 using the fixture 76, it is possible to provide a split point or a web thinning operation utilizing the fixture 84 by inserting the collet or chuck 78 in the tube 204 and positioning the collet or chuck 78, and more particularly, the cam lobe 138 with the stop notch 211 of the adjusting gauge or bracket 210 in accord with gauge setting legend 214. Upon proper setting of the chuck 78 in the tube 204, the point of the bit 80 is lowered in a controlled fashion by adjustment of knob 213 to engage the point of bit 80 with the right hand side of the grinding wheel 46. Lateral or axial adjustment of the orientation of the tube and more particularly the bit 80 retained in the tube 204 and chuck 78 is effected by operation of the knob 205 in combination with the handle 60.

FIGS. 14–20 further depict the split point function. The gauge 214 shown in FIG. 16 is utilized to adjust the bracket 210 by looking at the legend entitled "Split Point" and correlating the position of the bracket 210 with the drill point angle. The drill point angle is described in FIG. 25 as drill point angle 94. Having set the bracket member 210, it is now possible to orient the chuck 78 in the tube 204. A tightening knob 208 then retains the chuck 78 in the desired position. The point of the drill bit 80 as shown in FIG. 17 is then engaged against the rotating grinding wheel 46. As shown in FIG. 19 the wheel 46 will grind a split point, see FIG. 20. Adjustment of the knob 205 insures that the split point will be positioned at the midpoint of the drill bit 80.

Figure 22:
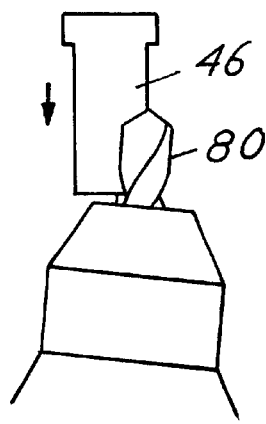
FIG. 22 is a schematic view illustrating a web thinning operation.
Figure 23:
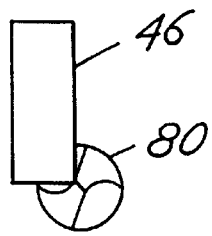
FIG. 23 is a schematic view further illustrating the web thinning operation of FIG. 22.
Figure 24:
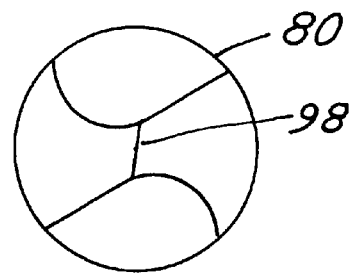
FIG. 24 is an end view of a drill bit having the web thinned by the mechanism of the invention.
Figure 31:
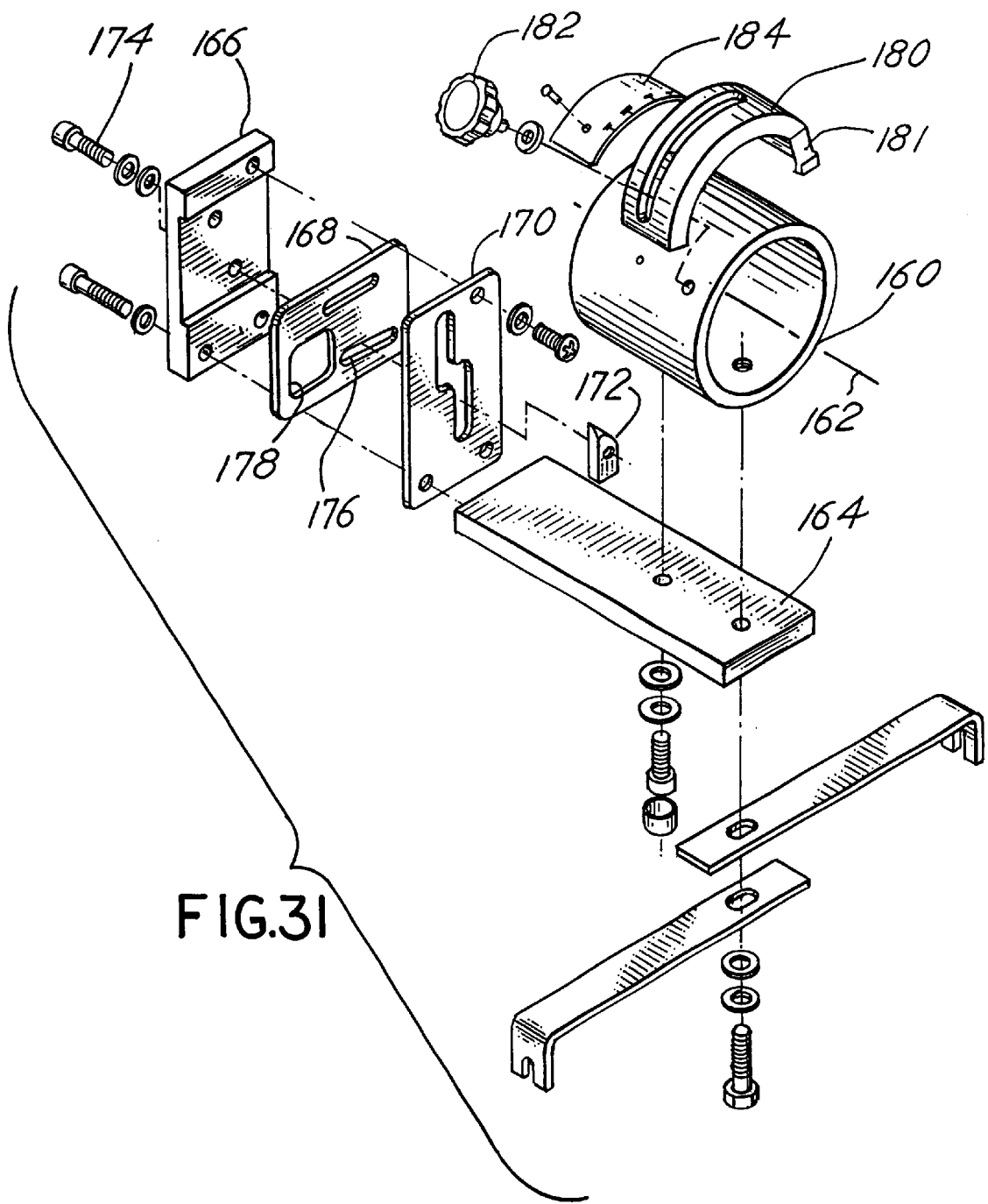
FIG. 31 is an exploded isometric view of the lip clearance angle fixture or bracket.

FIGS. 21–24 illustrate the operation of the drill grinder in order to provide a web thinning of the drill point. In web thinning, the bracket 210 is adjusted in accord with the web thinning legend of the gauge 214 in FIG. 16. After the bracket 210 is properly adjusted to accommodate the appropriate point angle 94, then the chuck or collet 78 is inserted into the tube 204 and the stop 138 engages with the stop 211. The chuck 78 is then tightly retained by operation of the knob 208. Again, as shown in FIG. 22, the bit 80 is engaged with the right hand side of the rotating grinding wheel 46. As shown in FIG. 23, the web 98 of the bit 80 is thereby thinned by the grinding wheel 46 with the resultant thinned web depicted in FIG. 24.

With the drill grinder of the invention, thus, it is possible to easily and effectively sharpen the point of drill bits of many various sizes. This is accomplished by properly aligning the drill bit in a carrying chuck 78 using an alignment fixture 82 and then placing the chuck 78 in a fixture 76 which provides for appropriate movement of the drill bit 80 with respect to the surface of the grinding wheel 48 in a manner known. The chuck 78 may then be removed and placed in another fixture 84 for engagement with a second grinding wheel 46 to effect a point splitting or web thinning operation. It is contemplated that various alternative constructions of the chuck 78 and the various fixtures may be incorporated in the invention. The invention is therefore to be limited only by the following claims and equivalents thereof.

What is claimed is:

1. A drill grinder construction comprising, in combination:
    a mounting platform;
    a grinding wheel fixed on the mounting platform for rotation about a wheel axis;
    a sharpening assembly plate slidably mounted on the mounting platform for movement parallel to the grinding wheel axis;
    a sharpening fixture supported on the mounting platform;
    a feed mechanism for movement of the sharpening fixture in a direction perpendicular to the grinding wheel axis;
    an adjustable pivot connection for attaching the sharpening fixture to the mounting plate by pivoting about an axis orthogonal to the grinding wheel axis and the direction of movement effected by the feed mechanism;
    a collet mount supported on the fixture; and
    a collet having a collet axis, said collet for holding a drill point extending along the collet axis and against the grinding wheel, said collet mounted in the collet mount for rotation about the collet axis, said collet comprised of a body member with a generally cylindrical internal axis passage and a frustoconical forward passage, said passage including a plurality of axially aligned slots;
    a collet plate slidably inserted into each slot, each plate including a drill bit engaging surface and an end surface;
    an annular washer within the passage for engaging the end surfaces simultaneously;
    a drive member adjustably mounted in the body for engaging and driving the washer into simultaneous engagement with the collet plates, said collet plates being thereby simultaneously movable toward or away from the collet axis by engagement of the collet plates with the frustoconical passage to grip a drill in the passage, by means of the drill engaging surfaces.

2. A drill grinder construction comprising, in combination:
    a mounting platform;
    a grinding wheel fixed on the mounting platform for rotation about a wheel axis;
    a sharpening assembly plate slidably mounted on the mounting platform for movement parallel to the grinding wheel axis;
    a sharpening fixture supported on the mounting platform;
    a feed mechanism for movement of the sharpening fixture in a direction perpendicular to the grinding wheel axis;
    an adjustable pivot connection for attaching the sharpening fixture to the mounting plate by pivoting about an axis orthogonal to the grinding wheel axis and the direction of movement effected by the feed mechanism;
    a collet mount supported on the fixture; and
    a collet having a collet axis, said collet for holding a drill point in a passage extending along the collet axis and against the grinding wheel, said collet mounted in the collet mount for rotation about the collet axis, said grinder further including a fixture for orienting the drill bit in a collet passage of the collet with respect to the axis of the grinding wheel comprising:
        a first bracket for receipt of the collet, said bracket including an adjustable stop for engaging the collet to set drill lip clearance for the drill by engaging a cam projection of a cam collar of the collet;
        a pair of opposed, spaced slidable stops mounted on a mounting plate perpendicular to the center line axis of the collet in the collet mount;
        a slidable plate parallel to the mounting plate connected to the slidable stops and movable therewith toward the axis as the slidable plate moves in a first direction and away from the axis as the slidable plate moves in the opposite direction; and
        means for adjusting the position of the slidable plate in correspondence to the diameter of a drill in the collet whereby the stops engage the lips of a drill between the stops and the drill may be fixed in said position by the collet.

3. A drill grinder construction comprising, in combination:
    a mounting platform;
    a grinding wheel fixed on the mounting platform for rotation about a wheel axis;
    a sharpening assembly plate slidably mounted on the mounting platform for movement parallel to the grinding wheel axis;
    a sharpening assembly plate slidably mounted on the mounting platform for movement parallel to the grinding wheel axis;
    a sharpening fixture supported on the mounting platform;
    a feed mechanism for movement of the sharpening fixture in a direction perpendicular to the grinding wheel axis;
    an adjustable pivot connection for attaching the sharpening fixture to the mounting plate by pivoting about an axis orthogonal to the grinding wheel axis and the direction of movement effected by the feed mechanism;
    a collet mount supported on the fixture; and
    a collet having a collet axis, said collet for holding a drill point extending along the collet axis and against the grinding wheel, said collet mounted in the collet mount for rotation about the collet axis; said collet further including a collet chuck having a hollow cylindrical body;
    a hollow jaw holder in the body with a plurality of axially extending jaw blades in slots in the body, said blades spaced peripherally around the holder;
    biasing means for biasing the blades radially outward;
    a hollow nose cone attached to the forward end of the body; and
    an adjustable drive for axially translating the jaw holder and jaw blades into the nose cone to thereby compress the blades on a drill bit in the cone surrounded by the blades.

4. The grinder of claim 3 wherein the chuck includes a replaceable nose cone with a frustoconical interior surface for guiding the blades toward the axis.

5. The grinder of claim 3 wherein the biasing means comprise cantilever springs connecting the hollow jaw holder to the blades.

6. The grinder of claim 3 further including a split point and web thinning subassembly comprising, in combination:

a fixture for the collet;

an adjustable stop for engaging the chuck in a fixed, non-rotatable position in the point forming bracket; and a pivot mounting for incrementally pivoting the split point bracket in a non-axial direction toward the grinding wheel.

* * * * *